W. E. PHELPS.
Seed Planter and Harrow.
No. 83,727.                               Patented Nov. 3, 1868.
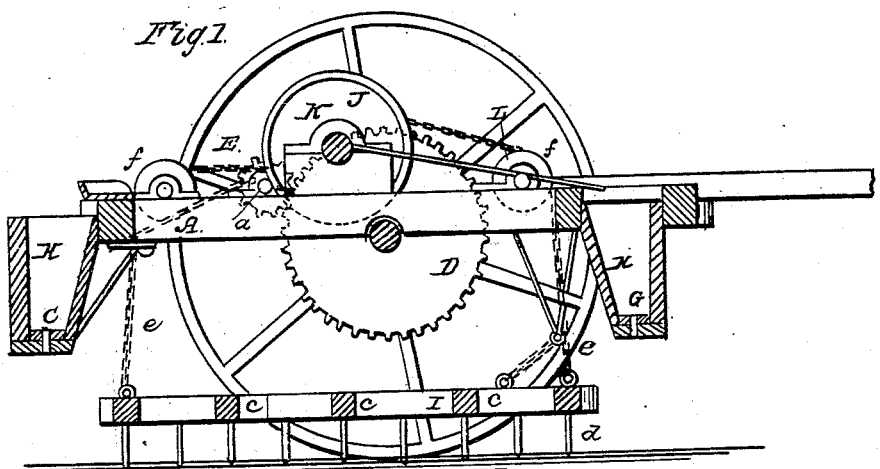
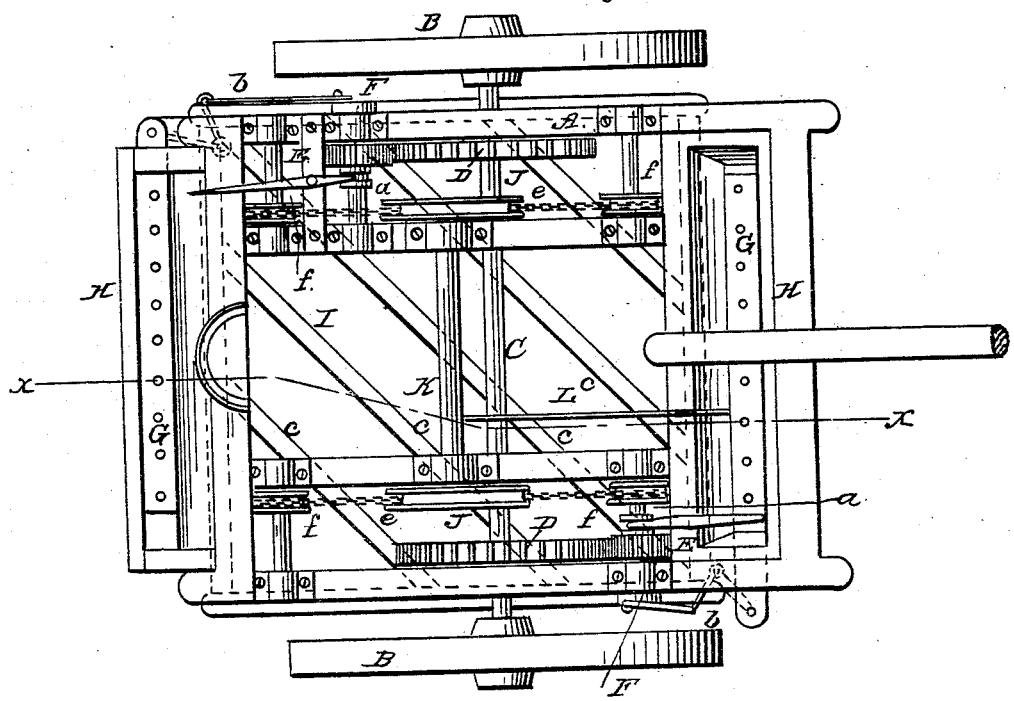

UNITED STATES PATENT OFFICE.

W. E. PHELPS, OF ELMWOOD, ILLINOIS.

IMPROVEMENT IN COMBINED SEEDER AND HARROW.

Specification forming part of Letters Patent No. 83,727, dated November 3, 1868.

*To all whom it may concern:*

Be it known that I, W. E. PHELPS, of Elmwood, in the county of Peoria and State of Illinois, have invented a new and Improved Combined Seed-Sower and Harrow; and I do hereby declare that the following is a full, clear, and exact description thereof, which will enable others skilled in the art to make and use the same, reference being had to the accompanying drawings, forming part of this specification.

This invention consists in the arrangement of two seed-boxes upon the frame, one being at the front and the other at the rear of the same, and of a harrow suspended from the frame between the seed-boxes.

In the accompanying sheet of drawings, Figure 1 is a side sectional view of my invention, taken in the line $x\ x$, Fig. 2. Fig. 2 is a plan or top view of the same.

Similar letters of reference indicate corresponding parts.

A represents a rectangular frame, which is mounted on two wheels, B B, the latter being keyed on their axle C, so that the latter will turn with the wheels.

On the axle C there are keyed two toothed wheels, D D, which, when the seed-sowing apparatus is in operation, gear into pinions E E, the latter being fitted on shafts $a\ a$ by means of a feather and groove, to admit of the pinions being shoved in and out of gear with the wheels D, and at the same time admit of the shafts $a\ a$ always turning with the pinions E E.

The pinions E E are placed at opposite sides of the machine, and one in front and the other at the rear of the axle, and at the outer end of each shaft a crank-pulley, F, is attached, and these crank-pulleys are connected by rods $b\ b$ with perforated seed-distributing slides G G, which are at the bottom of seed-boxes H H, one being placed at the front and the other at the rear end of the frame A. By this arrangement seed may be sown broadcast from either end of the machine, and either or both seed-distributing slides rendered inoperative, when desired, by throwing the pinions E out of gear with the wheels D.

I is a harrow, of rectangular form, and provided with diagonal bars $c$, into or through which the teeth $d$ are driven. This harrow is suspended by chains $e$ from each angle or corner, said chains passing over pulleys $f$ on the frame, and attached to wheels J J on a shaft, K, to which a lever, L, is secured .By this arrangement the harrow may be readily raised when required, and by having it thus suspended it will, as the machine is drawn along, be retained in a horizontal position, and not liable to be thrown up under the action of the draft, as is the case, to a greater or less extent, when the team is attached directly to the harrow.

By my improvement, therefore, the ground may be harrowed in a perfect manner, and grain or seed sowed simultaneously therewith and properly covered.

I am aware that two seed-boxes have been arranged upon a frame with a roller between them; and I am also aware that a harrow has been arranged upon a frame having one seed-box; but these form no part of my invention, and I do not therefore claim them; but

I claim as new and desire to secure by Letters Patent—

The arrangement, upon the frame A, of the adjustable harrow I and the seed-boxes H H, all operated in the manner described, for the purpose specified.

W. E. PHELPS.

Witnesses:
   H. P. TRACY,
   D. M. FARRAR.